(No Model.)
J. E. BEAMS.
SULKY HARROW.
No. 293,621. Patented Feb. 19, 1884.
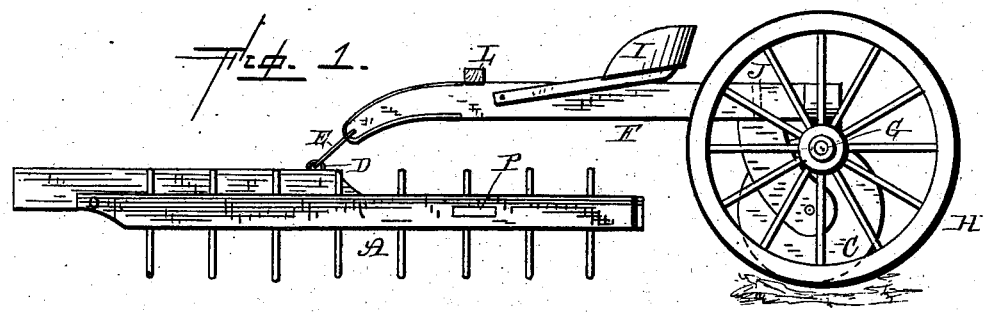
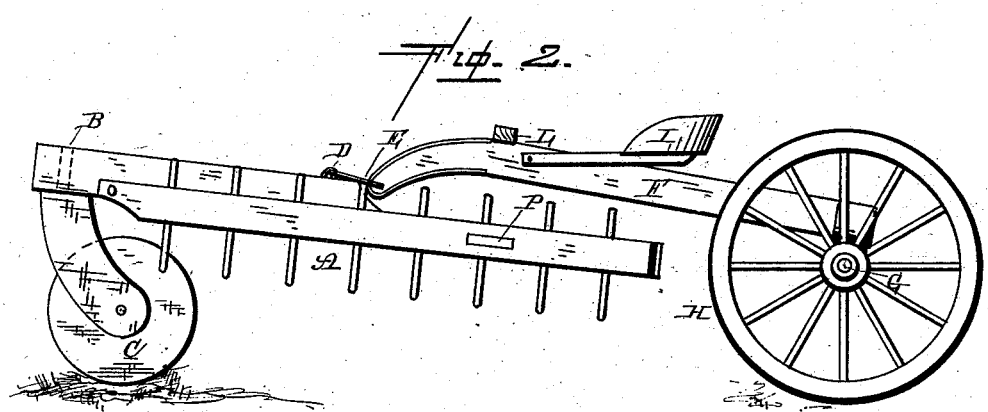
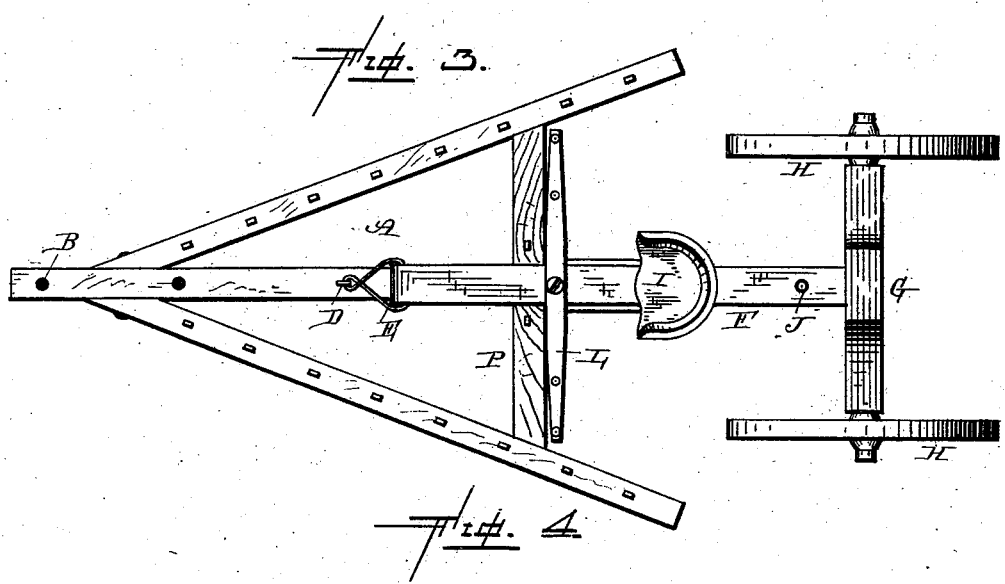
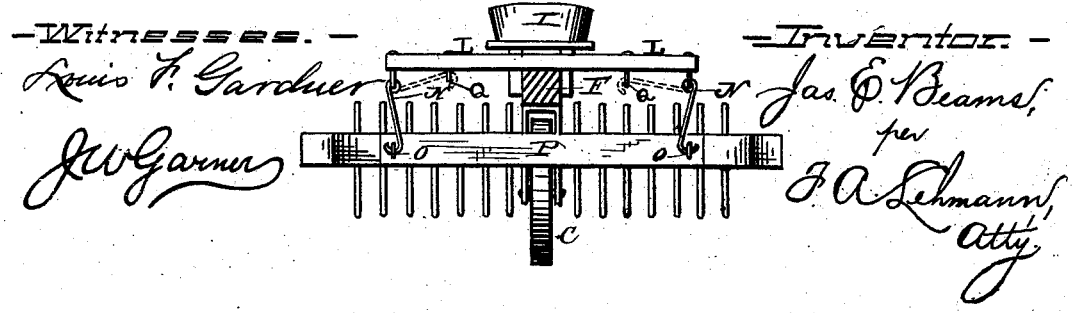
Witnesses.
Louis F. Gardner
J. W. Garner
Inventor.
Jas. E. Beams,
per
J. A. Lehmann,
Atty.

UNITED STATES PATENT OFFICE.

JAMES E. BEAMS, OF COLD WATER, OHIO.

SULKY-HARROW.

SPECIFICATION forming part of Letters Patent No. 293,621, dated February 19, 1884.

Application filed December 3, 1883. (No model.)

*To all whom it may concern:*

Be it known that I, JAMES E. BEAMS, of Cold Water, in the county of Mercer and State of Ohio, have invented certain new and useful Improvements in Sulky-Harrows; and I do hereby declare the following to be a full, clear, and exact description of the invention, such as will enable others skilled in the art to make and use it, reference being had to the accompanying drawings, which form part of this specification.

My invention relates to an improvement in sulky-harrows; and it consists in the combination of a harrow which has an opening through its front end for the reception of the pivot on the upper end of the standard carrying a caster-wheel, with a beam which is attached to the harrow at its front end, and which is supported at its rear end upon two wheels, and a cross-bar which is pivoted upon the beam, and which is provided with devices for supporting the rear end of the harrow, as will be more fully described hereinafter.

The object of my invention is to provide an attachment for harrows, by means of which a person can ride along behind the harrow without the fatigue and trouble of walking over the soft ground.

Figure 1 is a side elevation of a sulky-harrow embodying my invention, showing the harrow in use. Fig. 2 is a similar view, showing the harrow while being transported from place to place. Fig. 3 is a plan view of the same. Fig. 4 is a vertical cross-section taken through the beam on which the seat is placed.

A represents an ordinary triangular harrow, which has an opening, B, through its front end for the reception of the pivot on the upper end of the standard carrying the caster-wheel C, when the harrow is raised above the ground for the purpose of being transported from place to place, as shown in Fig. 2. Loosely fastened to the top of the central beam of this harrow A by means of the hook D and connection E is the beam F, which is secured at its rear end to the axle-tree G, which has the wheels H attached to its opposite ends. This beam may be of any suitable length, and has secured to it a seat, I, for the driver. Through this beam, just in advance of the axle-tree, is an opening, J, to receive the pivot of the frame carrying the caster-wheel C while the harrow is in use.

Pivoted upon the top of this beam is a cross-bar, L, from each end of which hangs a suitable hook, N. These hooks engage with other hooks, O, secured to the cross-beam P of the harrow, and serve to support the rear end of the harrow in its raised position, as shown. While the harrow is in operation, the caster-wheel is attached to the under side of the beam, through the hole J, and the hooks N on the cross-bar L are detached from the hooks O on the harrow. The harrow then rests upon the ground, while the front end of the beam is supported upon the central beam of the harrow, as shown. The driver sits upon the seat I and rides after the harrow without the fatigue and trouble of walking over the soft ground.

When the harrow is to be transported from place to place, the caster-wheel is removed from the hole J in the beam and placed in the hole B in the front of the harrow, and then the rear end of the harrow is raised up, so that the hooks N will engage with the hooks O. In this position the harrow is supported as shown in Fig. 4, and transported from place to place without the teeth coming in contact with the ground, and without much of an effort being required on the part of the draft animals. When the hooks N are not in use they are made to catch over the hooks Q, which extend down from the under side of the cross-bar L for this purpose. The driver rides not only while the harrow is being transported from place to place, but while engaged in harrowing the ground.

Having thus described my invention, I claim—

The combination of a harrow provided at its front end with means for the attachment of a removable caster-wheel, the beam hinged to the harrow at its front end, and supported at its rear end upon the axle-tree, which is supported upon wheels, and provided with a seat and a hole for the attachment of said caster-wheel, the cross-bar, and the hooks for supporting the rear end of the harrow while being transported substantially as shown.

In testimony whereof I affix my signature in presence of two witnesses.

JAMES E. BEAMS.

Witnesses:
SOLOMON R. BEAMS,
FRANK I. POHLMANN.